(12) United States Patent
Park

(10) Patent No.: US 8,432,620 B2
(45) Date of Patent: Apr. 30, 2013

(54) PHOTOGRAPHIC LENS OPTICAL SYSTEM

(75) Inventor: Hyoung Bae Park, Seoul (KR)

(73) Assignee: Kolen Co., Ltd. (KR)

( * ) Notice: Subject to any disclaimer, the term of this patent is extended or adjusted under 35 U.S.C. 154(b) by 40 days.

(21) Appl. No.: 13/242,813

(22) Filed: Sep. 23, 2011

(65) Prior Publication Data

US 2013/0077182 A1 Mar. 28, 2013

(51) Int. Cl.
*G02B 9/34* (2006.01)
*G02B 3/02* (2006.01)

(52) U.S. Cl.
USPC ........... 359/773; 359/715; 359/740; 359/771; 359/772

(58) Field of Classification Search .................. 359/715, 359/740, 771–773
See application file for complete search history.

(56) References Cited

U.S. PATENT DOCUMENTS

| | | | |
|---|---|---|---|
| 7,408,723 B1 * | 8/2008 | Lin ............................... | 359/715 |
| 7,609,454 B1 * | 10/2009 | Yin et al. ...................... | 359/648 |
| 7,710,666 B2 * | 5/2010 | Tsai .............................. | 359/772 |
| 7,777,972 B1 * | 8/2010 | Chen et al. .................... | 359/773 |
| 7,969,664 B2 * | 6/2011 | Tang et al. .................... | 359/773 |
| 8,294,997 B2 * | 10/2012 | Tang et al. .................... | 359/773 |
| 2009/0185292 A1 * | 7/2009 | Tsai .............................. | 359/771 |
| 2012/0063012 A1 * | 3/2012 | Lee et al. ...................... | 359/772 |
| 2012/0086848 A1 * | 4/2012 | Tsai et al. ..................... | 359/715 |
| 2012/0176687 A1 * | 7/2012 | Huang et al. .................. | 359/715 |

* cited by examiner

*Primary Examiner* — Evelyn A. Lester

(74) *Attorney, Agent, or Firm* — St. Onge Steward Johnston & Reens LLC

(57) ABSTRACT

A lens optical system having first to fourth lenses sequentially arranged from an object, and between the object and an image sensor on which an image of the object is formed. The first lens has a positive refractive power and is convex toward the object. The second lens has a negative refractive power and is biconcave. The third lens has a positive refractive power and is convex toward the image sensor. The fourth lens has a negative refractive power and at least one of an incident surface and an exit surface of the fourth lens is an aspherical surface. An aperture may be arranged between the first and second lenses.

12 Claims, 16 Drawing Sheets

PHOTOGRAPHIC LENS OPTICAL SYSTEM

FIELD OF THE INVENTION

The present invention relates to an optical device, and more particularly, to a lens optical system adopted in a camera.

BACKGROUND OF THE INVENTION

Cameras using solid state image devices, such as charge-coupled devices (CCDs) and complimentary metal oxide semiconductor (CMOS) image sensors, have been rapidly distributed.

Pixel integration degree of the solid state image devices has increased so as to increase the resolution of the cameras. Also, the cameras have been rapidly made compact and light due to the improvement in performance of lens optical systems built in the cameras.

In a general lens optical system of a camera, a large number of lenses including at least one glass lens are used to secure a performance of the lens optical system. When a lens optical system includes a large number of lenses, aberration may be easily corrected. Nevertheless, when a lens optical system includes many lenses, it may be difficult to make the camera compact and light. Also, manufacturing and product costs may be increased. Especially, a glass lens has a high manufacturing cost and, there are some restrictions in forming of the glass lens, so that it may be difficult to make a compact lens optical system.

SUMMARY OF THE INVENTION

The present invention provides a lens optical system that is compact and light and has a high resolution.

According to an aspect of the present invention, a lens optical system includes first to fourth lenses that are sequentially arranged from an object, and which are between the object and an image sensor on which an image of the object is formed. The first lens has a positive (+) refractive power and is convex toward the object, the second lens has a negative (−) refractive power and is biconcave, the third lens has a positive (+) refractive power and is convex toward the image sensor, and the fourth lens has a negative (−) refractive power and at least one of an incident surface and an exit surface of the fourth lens is an aspherical surface. An aperture is arranged between the first and second lenses and the following mathematical expressions are satisfied:

$$0.5 < f_1/f_3 < 1.5 \quad \text{Mathematical Expression 1}$$

$$2 < |r_4/r_5| < 7. \quad \text{Mathematical Expression 2}$$

In Mathematical Expression 1, $f_1$ and $f_3$ are respectively focal lengths of the first and third lenses and in Mathematical Expression 2, $r_4$ and $r_5$ are respectively a radius of curvature of an incident surface of the second lens and a radius of curvature of an exit surface of the second lens.

Each of the incident surface and the exit surface of the fourth lens may have at least one inflection point from a center portion toward an edge thereof.

The incident surface of the fourth lens may have one or two inflection points from a center portion toward an edge thereof.

The exit surface of the fourth lens may have one inflection point from a center portion toward an edge thereof.

The exit surface of the fourth lens may have one inflection point from a center portion toward an edge thereof.

The incident surface of the fourth lens may be convex with respect to the object at a center portion of the fourth lens and changed to be concave from the center portion toward an edge of the fourth lens, and the exit surface of the fourth lens may be concave with respect to the image sensor at the center portion of the fourth lens and changed to be convex from the center portion toward an edge of the fourth lens.

The incident surface of the fourth lens may be convex with respect to the object at a center portion of the fourth lens and changed to be concave and then convex from the center portion toward an edge of the fourth lens, and the exit surface of the fourth lens may be concave with respect to the image sensor at the center portion of the fourth lens and changed to be convex from the center portion toward an edge of the fourth lens.

At least one of an incident surface and an exit surface of at least one of the first to third lenses may be an aspherical surface.

The second to fourth lenses may be aberration correction lenses.

The lens optical system may further include an infrared ray prevention unit that is arranged between the object and the image sensor.

The infrared ray prevention unit may be arranged between the fourth lens and the image sensor.

At least one of the first to fourth lenses may be a plastic lens.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
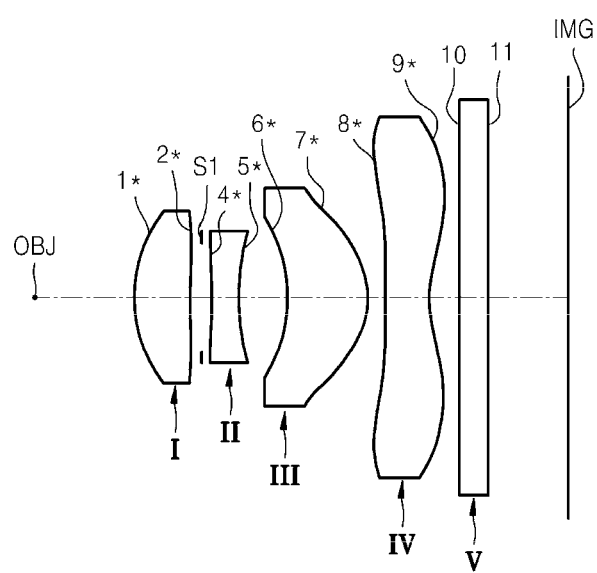
FIGS. 1 through 4 are sectional views illustrating an arrangement of main elements of lens optical systems according to first to fourth embodiments of the present invention.

The attached drawings for illustrating exemplary embodiments of the present invention are referred to in order to gain a sufficient understanding of the present invention, the merits thereof, and the objectives accomplished by the implementation of the present invention. Hereinafter, the present invention will be described in detail by explaining exemplary embodiments of the invention with reference to the attached drawings. Like reference numerals in the drawings denote like elements.

FIGS. 1 through 4 are sectional views illustrating an arrangement of main elements of lens optical systems according to first to fourth embodiments of the present invention.

Referring to FIGS. 1 through 4, a lens optical system according to each of the embodiments of the present invention includes a first lens I, a second lens II, a third lens III, and a fourth lens IV that are arranged between an object OBJ and an image sensor IMG on which an image of the object OBJ is formed, and sequentially arranged from the object OBJ toward the image sensor IMG.

Figure 2:
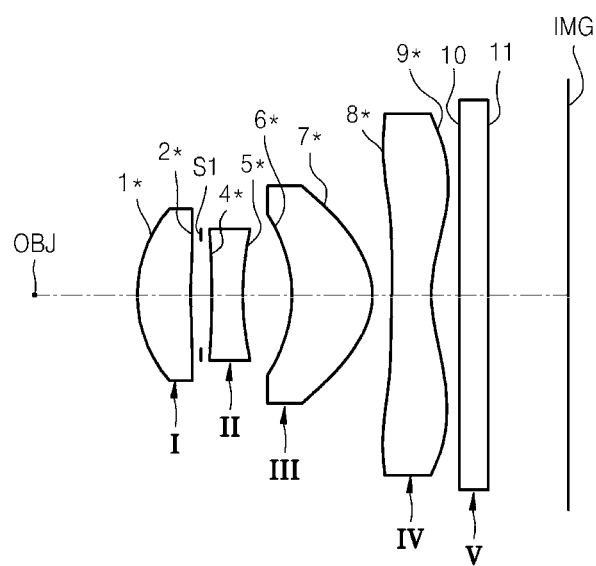
Figure 3:
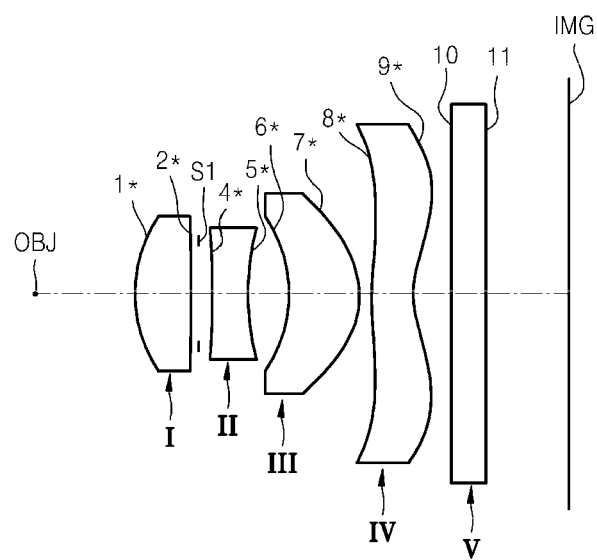
Figure 4:
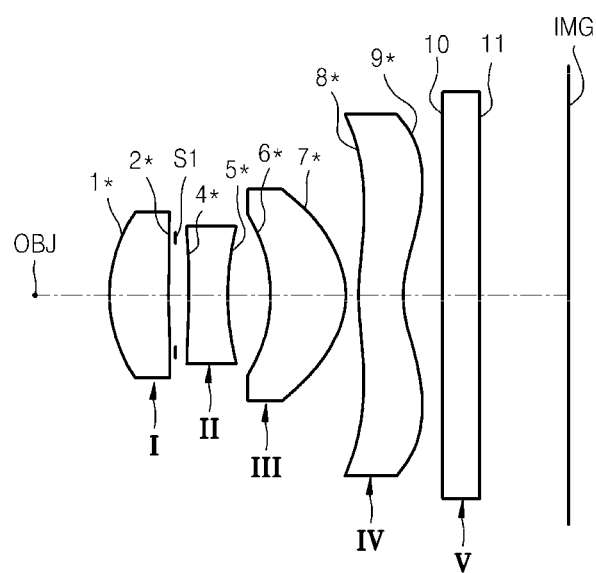

The first lens I may have a positive (+) refractive power and may be a meniscus lens that is convex toward the object OBJ. The second lens II may have a negative (−) refractive power and both surfaces of the second lens II, that is, an incident surface 4* and an exit surface 5* may be concave. The third lens III may be a meniscus lens having a positive (+) refractive power and convex toward the image sensor IMG. At least one of incident surfaces 1*, 4*, and 6* and exit surfaces 2*, 5*, and 7* of the first to third lenses I, II, and III may be an aspherical surface. For example, all of the incident surfaces 1*, 4*, and 6* and the exit surfaces 2*, 5*, and 7* of each of the first to third lenses I, II, and III may be aspherical surfaces. The fourth lens IV may have a negative (−) refractive power. At least one of an incident surface 8* and an exit surface 9* of the fourth lens IV may be an aspherical surface. For example, each of the incident surface 8* and the exit surface 9* of the fourth lens IV may be an aspherical surface having at least one inflection point from a center portion toward an edge thereof. In detail, the incident surface 8* of the fourth lens IV may have two inflection points from the center portion toward the edge thereof as shown in the embodiments of FIGS. 1 and 2, or one inflection point from the center portion toward the edge thereof as shown in the embodiments of FIGS. 3 and 4. The exit surface 9* of the fourth lens IV may have one inflection point from a center portion toward an edge thereof as shown in the embodiments of FIGS. 1 through 4. In other words, the incident surface 8* of the fourth lens IV may be convex with respect to the object OBJ at the center portion thereof and changed to be concave and then convex from the center portion toward the edge thereof (see FIGS. 1 and 2), or the incident surface 8* of the fourth lens IV may be convex with respect to the object OBJ at the center portion thereof and changed to be concave from the center portion toward the edge thereof (see FIGS. 3 and 4). The exit surface 9* of the fourth lens IV may be concave with respect to the image sensor IMG at the center portion thereof and changed to be convex from the center portion toward the edge thereof (see FIGS. 1 through 4). The second to fourth lenses II-IV may function as aberration correction lenses.

The lens optical system may further include an aperture S1 between the first lens I and the second lens II, and an infrared ray prevention unit V between the fourth lens IV and the image sensor IMG. The infrared ray prevention unit V may be an infrared ray prevention filter. The infrared ray prevention unit V may be provided between the object OBJ and the fourth lens IV.

The lens optical systems configured as above according to the above-described embodiments may satisfy at least one of the following mathematical expressions.

$$0.5 < f_1/f_3 < 1.5 \quad \text{Mathematical Expression 1}$$

In Mathematical Expression 1, "$f_1$" denotes a focal length of the first lens I, and "$f_3$" denotes a focal length of the third lens III.

Mathematical Expression 1 relates to distribution of refractive powers of the lenses having a positive (+) refractive power, that is, the first and third lenses I and III, and expresses conditions for decreasing spherical aberration of the overall lens optical system. In Mathematical Expression 1, when "$f_1/f_3$" is equal to or greater than an upper limit of 1.5, although it is advantageous to make a compact lens optical system, spherical aberration may increase. In contrast, when "$f_1/f_3$" is equal to or lower than a lower limit of 0.5, although it is advantageous to correct spherical aberration, the total length of a lens optical system increases so that making a compact lens optical system may be difficult.

$$2 < |r_4/r_5| < 7 \quad \text{Mathematical Expression 2}$$

In Mathematical Expression 2, "$r_4$" denotes a radius of curvature of the incident surface 4* of the second lens II, and "$r_5$" denotes a radius of curvature of the exit surface 5* of the second lens II.

Mathematical Expression 2 expresses conditions for determining the refractive power of the second lens II having a negative (−) refractive power. When the second lens II satisfying Mathematical Expression 2, that is, having a relatively strong negative (−) refractive power, is in use, chromatic aberration may be easily corrected by using the second lens II.

In the above-described embodiments of the present invention, the values of Mathematical Expressions 1 and 2 are shown in Tables 1 and 2.

TABLE 1

| Classification | $f_1$ | $f_3$ | Mathematical Expression 1 (0.5 < $f_1/f_3$ < 1.5) |
|---|---|---|---|
| 1st embodiment | 2.563 | 2.219 | 1.155 |
| 2nd embodiment | 2.608 | 1.8845 | 1.384 |
| 3rd embodiment | 2.128 | 2.1416 | 0.994 |
| 4th embodiment | 2.084 | 2.2245 | 0.937 |

TABLE 2

| Classification | $r_4$ | $r_5$ | Mathematical Expression 2 (2 < |$r_4/r_5$| < 7) |
|---|---|---|---|
| 1st embodiment | −12.618 | 3.828 | 3.296 |
| 2nd embodiment | −16.950 | 3.206 | 5.288 |
| 3rd embodiment | −17.818 | 2.862 | 6.225 |
| 4th embodiment | −7.207 | 3.566 | 2.021 |

Referring to Tables 1 and 2, it can be seen that the lens optical systems of the first to fourth embodiments satisfy Mathematical Expressions 1 and 2.

In the lens optical systems according to the above-described embodiments, the first to fourth lenses I, II, III and IV may be manufactured of plastic in consideration of the shape and dimension thereof. That is, the first to fourth lenses I, II, III and IV may be all plastic lenses. In the case of a glass lens, a compact lens optical system is difficult to make due to a high manufacturing cost and strict conditions for forming. In the present invention, however, since all of the first to fourth lenses I, II, III and IV may be manufactured of plastic, a variety of advantages according thereto may be obtained. Nevertheless, in the present invention, the material of the first to fourth lenses I, II, III and IV is not limited to plastic. If necessary, at least one of the first to fourth lenses I, II, III and IV may be manufactured of glass.

The lens optical systems according to the above-described embodiments of the present invention will be described in detail with reference to lens data and the accompanying drawings.

Tables 3 through 6 each shows radiuses of curvature, lens thicknesses or distances between lenses, refractive indexes, and the Abbe numbers of the lenses constituting the lens optical systems of FIGS. 1 through 4. In Tables 3 through 6, "r" denotes a radius of curvature, "d" denotes a lens thickness or a distance between lenses or neighboring constituent elements, "$N_d$" denotes a refractive index of a lens measured by using a d-line, and "$V_d$" denotes the Abbe number. In numbers of the surfaces of the lenses in Tables 3 through 6, the mark * denotes that a corresponding lens surface is an aspherical surface. The unit of "r" and "d" is millimeters (mm).

TABLE 3

| 1st embodiment | Surface | r | d | $N_d$ | $V_d$ |
|---|---|---|---|---|---|
| I | 1* | 1.372 | 0.576 | 1.54 | 56.0 |
|   | 2* | 57.274 | 0.100 |   |   |
|   | S1 | infinity | 0.100 |   |   |
| II | 4* | −12.618 | 0.300 | 1.63 | 23.00 |
|   | 5* | 3.828 | 0.496 |   |   |
| III | 6* | −1.648 | 0.815 | 1.54 | 56.0 |
|   | 7* | −0.820 | 0.183 |   |   |
| IV | 8* | 12.394 | 0.453 | 1.53 | 55.70 |
|   | 9* | 1.240 | 0.300 |   |   |
| V | 10 | infinity | 0.300 | 1.51 | 64.1 |
|   | 11 |   | 0.820 |   |   |
|   | IMG | infinity |   |   |   |

TABLE 4

| 2nd embodiment | Surface | r | d | $N_d$ | $V_d$ |
|---|---|---|---|---|---|
| I | 1* | 1.363 | 0.556 | 1.54 | 56.0 |
|   | 2* | 57.459 | 0.100 |   |   |
|   | S1 | infinity | 0.100 |   |   |
| II | 4* | −16.950 | 0.310 | 1.63 | 23.00 |
|   | 5* | 3.206 | 0.496 |   |   |
| III | 6* | −1.864 | 0.840 | 1.54 | 56.0 |
|   | 7* | −0.755 | 0.195 |   |   |
| IV | 8* | 11.334 | 0.400 | 1.53 | 55.70 |
|   | 9* | 1.062 | 0.300 |   |   |
| V | 10 | infinity | 0.300 | 1.51 | 64.1 |
|   | 11 |   | 0.810 |   |   |
|   | IMG | infinity |   |   |   |

TABLE 5

| 3rd embodiment | Surface | r | d | $N_d$ | $V_d$ |
|---|---|---|---|---|---|
| I | 1* | 1.095 | 0.453 | 1.53 | 55.70 |
|   | 2* | 26.669 | 0.050 |   |   |
|   | S1 | infinity | 0.100 |   |   |
| II | 4* | −17.818 | 0.300 | 1.63 | 23.00 |
|   | 5* | 2.862 | 0.336 |   |   |
| III | 6* | −1.085 | 0.582 | 1.53 | 55.70 |
|   | 7* | −0.660 | 0.100 |   |   |
| IV | 8* | 1.924 | 0.349 | 1.53 | 55.70 |
|   | 9* | 0.803 | 0.300 |   |   |
| V | 10 | infinity | 0.300 | 1.51 | 64.1 |
|   | 11 |   | 0.680 |   |   |
|   | IMG | infinity |   |   |   |

TABLE 6

| 4th embodiment | Surface | r | d | $N_d$ | $V_d$ |
|---|---|---|---|---|---|
| I | 1* | 1.075 | 0.461 | 1.54 | 56.0 |
|   | 2* | 27.478 | 0.050 |   |   |
|   | S1 | infinity | 0.100 |   |   |
| II | 4* | −7.207 | 0.300 | 1.63 | 23.00 |
|   | 5* | 3.566 | 0.336 |   |   |

TABLE 6-continued

| 4th embodiment | Surface | r | d | $N_d$ | $V_d$ |
|---|---|---|---|---|---|
| III | 6* | −1.095 | 0.579 | 1.54 | 56.0 |
|   | 7* | −0.674 | 0.100 |   |   |
| IV | 8* | 1.784 | 0.344 | 1.53 | 55.70 |
|   | 9* | 0.792 | 0.300 |   |   |
| V | 10 | infinity | 0.300 | 1.51 | 64.1 |
|   | 11 |   | 0.680 |   |   |
|   | IMG | infinity |   |   |   |

The aperture ratio (Fno) and the focal length (f) of each lens optical system according to the first to fourth embodiments of the present invention corresponding to FIGS. 1 through 4 are shown in Table 7.

TABLE 7

| Classification | Aperture Ratio (Fno) | Focal Length (f) [mm] |
|---|---|---|
| 1st embodiment | 2.6 | 3.549 |
| 2nd embodiment | 2.6 | 3.474 |
| 3rd embodiment | 2.8 | 2.787 |
| 4th embodiment | 2.8 | 3.600 |

Also, the aspherical surface of each lens of the lens optical systems according to the first to fourth embodiments of the present invention satisfy the following aspherical surface equation of Mathematical Expression 3.

Mathematical Expression 3

$$x = \frac{c' y^2}{1 + \sqrt{1 - (K+1)c'^2 y^2}} + Ay^4 + By^6 + Cy^8 + Dy^{10} + Ey^{12} + Fy^{14} + Gy^{16} + Hy^{18} + Jy^{20}$$

In Mathematical Expression 3, "x" denotes a distance from the apex of a lens in a direction along an optical axis, "y" denotes a distance in a direction perpendicular to the optical axis, "c'" denotes a reciprocal number (=1/r) of a radius of curvature at the apex of a lens, "K" denotes a conic constant, and "A, B, C, D, E, F, G, H, and J" each denotes an aspherical surface coefficient.

Tables 8 through 11 respectively show aspherical surface coefficients of aspherical surfaces of the lens optical systems according to the first to fourth embodiments corresponding to FIGS. 1 through 4. That is, Tables 8 through 11 respectively show aspherical surface coefficients of incident surfaces 1*, 4*, 6*, and 8* and exit surfaces 2*, 5*, 7*, and 9* of the respective lenses of Tables 3 through 6.

TABLE 8

|   | 1* | 2* | 4* | 5* | 6* | 7* | 8* | 9* |
|---|---|---|---|---|---|---|---|---|
| K | 0.062 | 5345.686 | −666.071 | 11.054 | 1.349 | −2.613 | −9000.000 | −10.410 |
| A | −0.003 | 0.0474 | 0.1086 | 0.1746 | 0.0038 | −0.1681 | −0.0991 | −0.1065 |
| B | 0.0515 | −0.0674 | −0.2278 | −0.1150 | −0.1934 | 0.0356 | 0.0433 | 0.0388 |
| C | −0.2072 | −0.0562 | 0.1092 | −0.0930 | 0.4785 | 0.0085 | −0.0036 | −0.0121 |
| D | 0.4222 | 0.0663 | −0.4563 | 0.1034 | −0.5988 | −0.0625 | −0.0004 | 0.0018 |
| E | −0.2703 | −0.2648 | 0.5450 | 0.5026 | 0.3665 | 0.0740 | $-4.1138 \times 10^{-5}$ | $2.2031 \times 10^{-5}$ |
| F | −0.3430 | — | −0.4528 | −0.5566 | 0.6434 | −0.0210 | $-7.6971 \times 10^{-6}$ | $-1.4365 \times 10^{-5}$ |
| G | 0.2250 | — | 0.5360 | −0.2709 | −0.3279 | 0.0124 | $6.0034 \times 10^{-6}$ | $-9.3755 \times 10^{-7}$ |
| H | 0.6037 | — | — | 0.3783 | −0.5421 | 0.0062 | $2.5293 \times 10^{-6}$ | $-6.3720 \times 10^{-8}$ |
| J | −0.6542 | — | — | 0.0053 | 0.2588 | −0.0088 | $-5.8830 \times 10^{-7}$ | $5.5263 \times 10^{-8}$ |

TABLE 9

|   | 1* | 2* | 4* | 5* | 6* | 7* | 8* | 9* |
|---|---|---|---|---|---|---|---|---|
| K | 0.1052 | 5602.4729 | −767.7106 | 7.4454 | 1.6843 | −2.7288 | −6048.5788 | −9.1296 |
| A | 0.0044 | 0.0493 | 0.0815 | 0.1341 | −0.0297 | −0.2031 | −0.0833 | −0.1008 |
| B | 0.0619 | −0.0690 | −0.2541 | −0.1126 | −0.1571 | 0.0579 | 0.0406 | 0.0377 |
| C | −0.2082 | −0.0320 | 0.1483 | −0.0143 | 0.4549 | 0.0073 | −0.0044 | −0.0114 |
| D | 0.4361 | 0.0394 | −0.5393 | −0.1201 | −0.6077 | −0.0775 | −0.0004 | 0.0017 |
| E | −0.3302 | −0.3227 | 0.5107 | 0.5438 | 0.2641 | 0.0675 | $-2.5530 \times 10^{-5}$ | $1.4047 \times 10^{-5}$ |
| F | −0.2897 | — | −0.4528 | −0.6760 | 0.5491 | −0.0201 | $-5.2594 \times 10^{-6}$ | $-1.0000 \times 10^{-5}$ |
| G | 0.2917 | — | 0.5360 | 0.0724 | −0.1549 | 0.0159 | $7.1701 \times 10^{-6}$ | $-6.1373 \times 10^{-7}$ |
| H | 0.6132 | — | — | 0.3783 | −0.4164 | 0.0083 | $2.4186 \times 10^{-6}$ | $-1.4607 \times 10^{-7}$ |
| J | −0.8269 | — | — | 0.0053 | −0.1623 | −0.0125 | $-8.2985 \times 10^{-7}$ | $-6.1195 \times 10^{-8}$ |

TABLE 10

|   | 1* | 2* | 4* | 5* | 6* | 7* | 8* | 9* |
|---|---|---|---|---|---|---|---|---|
| K | 0.0375 | 962.9598 | 194.6632 | −2.6962 | 1.0173 | −2.0541 | −49.6161 | −7.5713 |
| A | 0.0129 | 0.0302 | 0.1237 | 0.3305 | 0.1728 | −0.3279 | −0.2227 | −0.2494 |
| B | 0.1141 | −0.3795 | −1.1900 | −0.3027 | −0.5155 | 0.1724 | 0.1183 | 0.1478 |
| C | −0.9774 | −1.2164 | 1.6306 | −0.4485 | 2.4758 | −0.1184 | −0.0060 | −0.0698 |
| D | 3.0935 | 1.5312 | −8.3939 | 1.4341 | −3.9445 | −0.6579 | −0.0013 | 0.0124 |
| E | −4.5355 | −4.8180 | 4.4175 | 3.0873 | 7.3613 | 1.3173 | −0.0022 | 0.0014 |
| F | −6.5779 | $4.4165 \times 10^{-8}$ | 6.3481 | −11.6480 | 9.3371 | −0.0875 | −0.0015 | 0.0002 |
| G | 8.2965 | $6.4618 \times 10^{-9}$ | 16.5931 | 4.7867 | 0.8776 | 0.7240 | −0.0002 | −0.0002 |
| H | 25.6572 | $4.4677 \times 10^{-8}$ | — | 4.7297 | −26.1182 | 0.2642 | 0.0002 | −0.0001 |
| J | −66.8534 | $2.7172 \times 10^{-8}$ | — | −18.9090 | −59.7434 | −1.8685 | $3.0063 \times 10^{-5}$ | $1.5881 \times 10^{-5}$ |

TABLE 11

|   | 1* | 2* | 4* | 5* | 6* | 7* | 8* | 9* |
|---|---|---|---|---|---|---|---|---|
| K | 0.0592 | 2631.3883 | −16.5007 | −1.1984 | 1.1143 | −2.0566 | −38.4305 | −7.0314 |
| A | 0.0172 | 0.0253 | 0.1269 | 0.3379 | 0.1801 | −0.3264 | −0.2248 | −0.2471 |
| B | 0.1074 | −0.3969 | −1.1801 | −0.2974 | −0.4831 | 0.1785 | 0.1136 | 0.1442 |
| C | −0.9332 | −1.0938 | 1.3531 | −0.5349 | 2.3195 | −0.1176 | −0.0083 | −0.0686 |
| D | 3.2364 | 0.1124 | −8.4108 | 1.0575 | −4.3548 | −0.6794 | −0.0005 | 0.0122 |
| E | −4.5047 | −4.8180 | 4.4175 | 3.9244 | 7.0145 | 1.2730 | −0.0016 | 0.0011 |
| F | −7.3849 | — | 6.3481 | −11.6480 | 10.1701 | −0.1562 | −0.0013 | 0.0002 |
| G | 6.6211 | — | 16.5931 | 4.7867 | 0.8776 | 0.6609 | −0.0002 | −0.0002 |
| H | 29.3889 | — | — | 4.7297 | −26.1182 | 0.2981 | 0.0002 | −0.0001 |
| J | −66.8534 | — | — | −18.9090 | −59.7434 | −1.5922 | $3.4166 \times 10^{-5}$ | $1.3711 \times 10^{-5}$ |

Figure 5A:
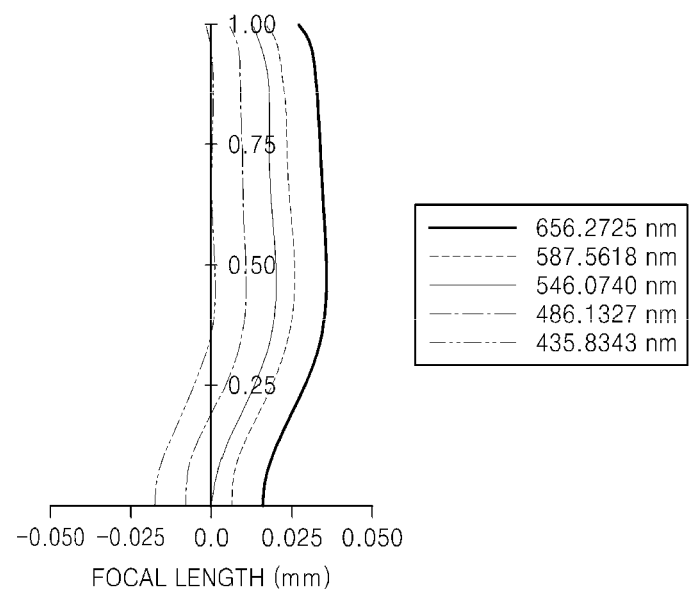
FIGS. 5A through 5C are aberration diagrams illustrating longitudinal spherical aberration, astigmatic field curvature, and distortion of the lens optical system according to the first embodiment of the present invention.
Figure 5B:
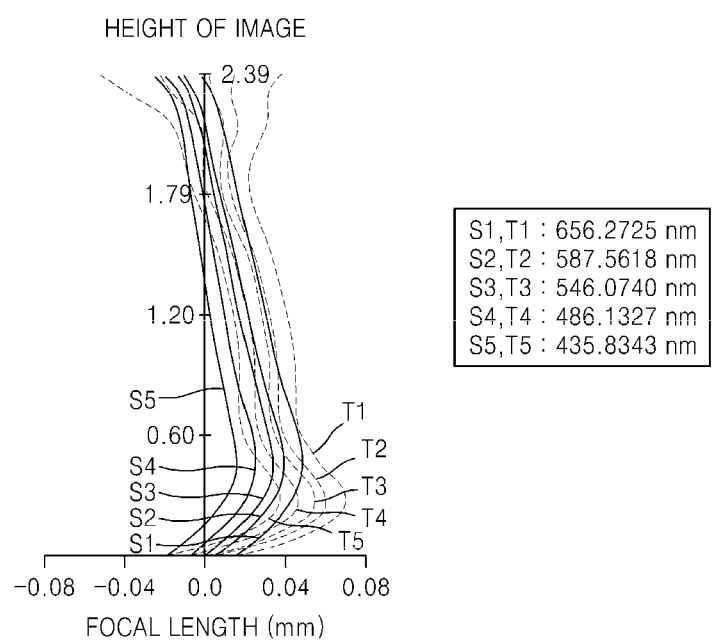
Figure 5C:
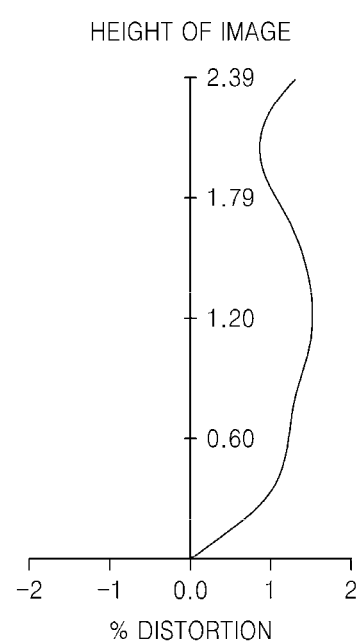

FIGS. 5A through 5C are aberration diagrams illustrating longitudinal spherical aberration, astigmatic field curvature, and distortion of the lens optical system having data of Table 3, according to the first embodiment of the present invention shown in FIG. 1. FIG. 5A illustrates spherical aberration of a lens optical system with respect to light of various wavelengths. FIG. 5B illustrates astigmatic field curvature of a lens optical system with respect to light of various wavelengths, that is, tangential field curvature T1-T5 and sagittal field curvature S1-S5. The wavelengths of light used to obtain the results of FIGS. 5A and 5B are 435.8343 nm, 486.1327 nm, 546.0740 nm, 587.5618 nm, and 656.2725 nm. The wavelength of light used to obtain the data of FIG. 5C is 546.0740 nm.

Figure 6A:
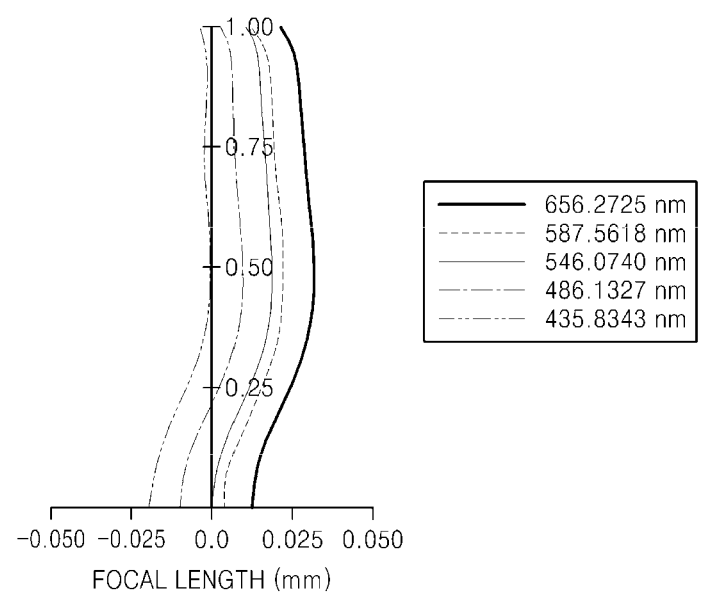
FIGS. 6A through 6C are aberration diagrams illustrating longitudinal spherical aberration, astigmatic field curvature, and distortion of the lens optical system according to the second embodiment of the present invention.
Figure 6B:
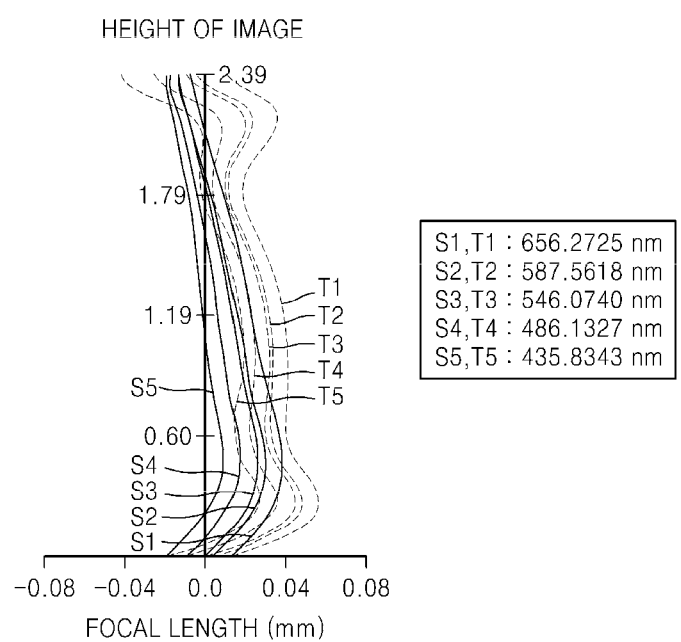
Figure 6C:
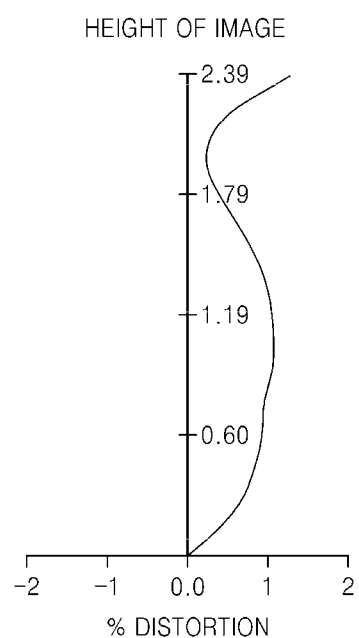
Figure 7A:
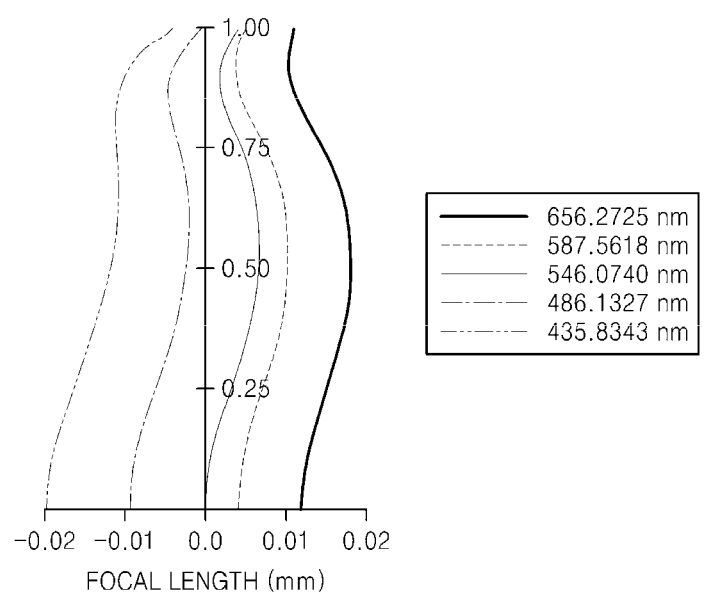
FIGS. 7A through 7C are aberration diagrams illustrating longitudinal spherical aberration, astigmatic field curvature, and distortion of the lens optical system according to the third embodiment of the present invention.
Figure 7B:
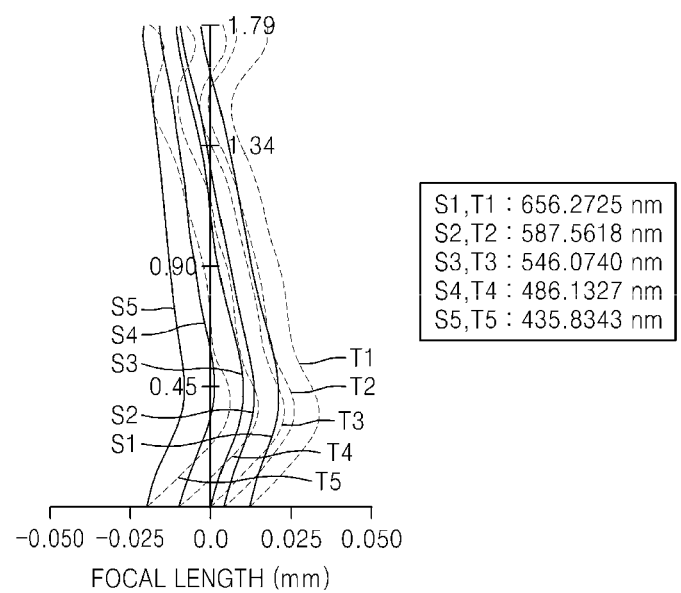
Figure 7C:
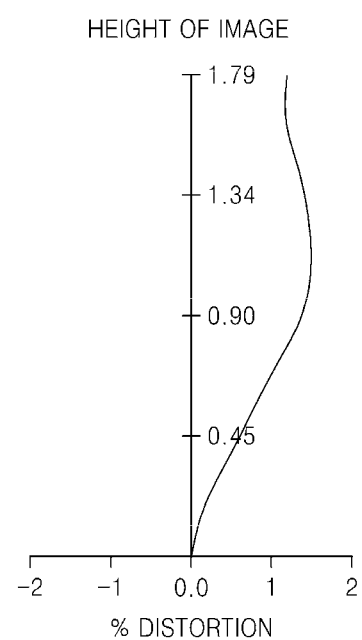
Figure 8A:
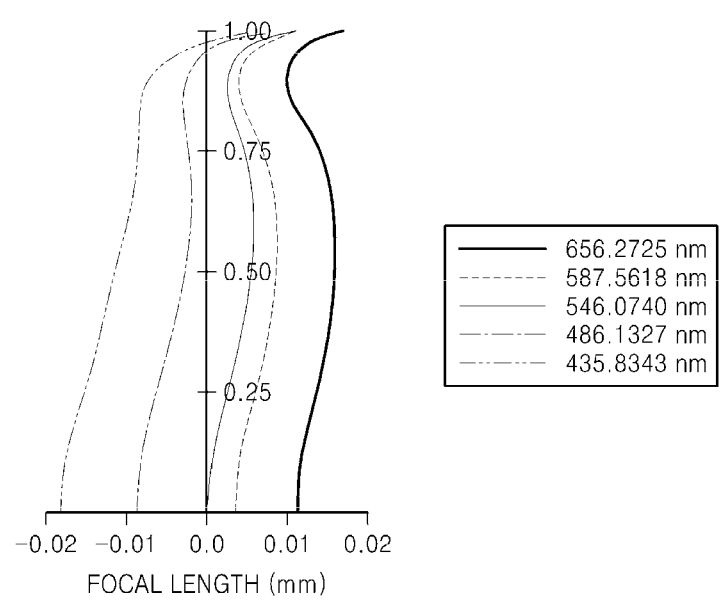
FIGS. 8A through 8C are aberration diagrams illustrating longitudinal spherical aberration, astigmatic field curvature, and distortion of the lens optical system according to the fourth embodiment of the present invention.
Figure 8B:
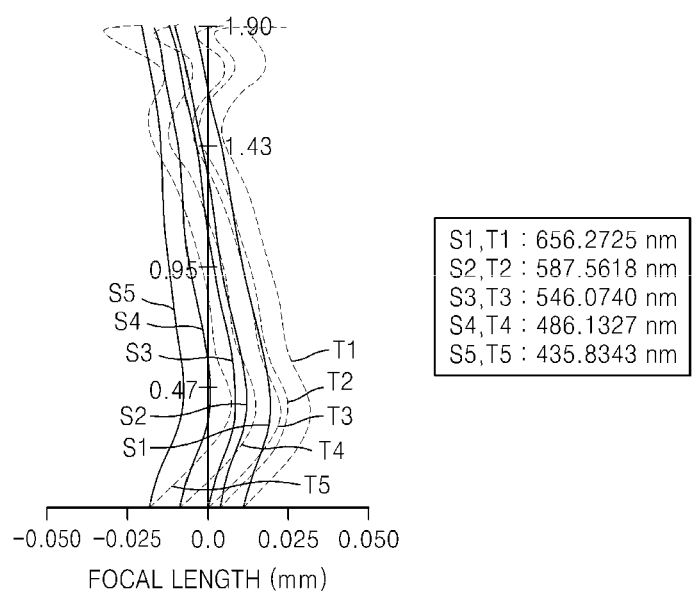
Figure 8C:
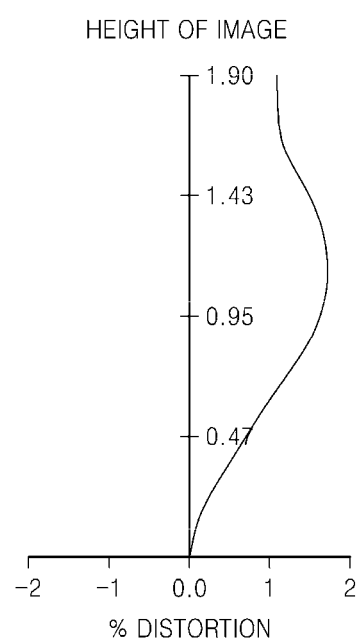

FIGS. 6A through 6C are aberration diagrams illustrating longitudinal spherical aberration, astigmatic field curvature, and distortion of the lens optical system having data of Table 4, according to the second embodiment of the present invention shown in FIG. 2;

FIGS. 7A through 7C are aberration diagrams illustrating longitudinal spherical aberration, astigmatic field curvature, and distortion of the lens optical system having data of Table 5, according to the third embodiment of the present invention shown in FIG. 3; and FIGS. 8A through 8C are aberration diagrams illustrating longitudinal spherical aberration, astigmatic field curvature, and distortion of the lens optical system having data of Table 6, according to the fourth embodiment of the present invention shown in FIG. 4.

As described above, the lens optical system according to the present invention includes the first to fourth lenses I, II, III and IV respectively having positive (+), negative (−), positive (+), and negative (−) refractive powers and sequentially arranged in a direction from the object OBJ to the image sensor IMG, and may satisfy at least any one of Mathematical Expressions 1 and 2. The lens optical system configured as above may be advantageous in embodying a small and light camera having a high performance. Thus, according to the present invention, a lens optical system while being small and light and also providing a high resolution may be embodied.

In a lens optical system according to the present invention, when the incident surface 8* and the exit surface 9* of the fourth lens IV are aspherical surfaces having at least one inflection point from the center portion thereof toward the edge thereof, various aberrations may be easily corrected using the fourth lens IV. Also, vignetting may be prevented by reducing an exit angle of a chief ray.

Also, as described above, by manufacturing the first to fourth lenses I, II, III and IV of plastic and forming both surfaces, that is, an incident surface and an exit surface, of each lenses to be aspherical surfaces, a lens optical system that is compact and exhibits superior performance may be embodied at a low cost compared to a case of using a glass lens.

While this invention has been particularly shown and described with reference to exemplary embodiments thereof, it will be understood by those skilled in the art that various changes in form and details may be made therein without departing from the spirit and scope of the invention as defined by the appended claims. For example, at least one of the first to fourth lenses I, II, III and IV may be manufactured of not plastic, but a glass material. Also, a shield film may be used instead of a filter as the infrared ray prevention unit V. Therefore, the scope of the invention is defined not by the detailed description of the invention but by the appended claims.

It should be understood that the exemplary embodiments described herein should be considered in a descriptive sense only and not for purposes of limitation. Descriptions of features or aspects within each embodiment should typically be considered as available for other similar features or aspects in other embodiments.

What is claimed is:

1. A lens optical system comprising first to fourth lenses that are sequentially arranged from an object, and which are between the object and an image sensor on which an image of the object is formed,
wherein the first lens has a positive (+) refractive power and is convex toward the object, the second lens has a negative (−) refractive power and is biconcave, the third lens has a positive (+) refractive power and is convex toward the image sensor, and the fourth lens has a negative (−) refractive power and at least one of an incident surface and an exit surface of the fourth lens is an aspherical surface,
wherein an aperture is arranged between the first and second lenses and the following mathematical expressions are satisfied:

$$0.5 < f_1/f_3 < 1.5 \quad \text{Mathematical Expression 1}$$

$$2 < |r_4/r_5| < 7, \quad \text{Mathematical Expression 2}$$

wherein, in Mathematical Expression 1, $f_1$ and $f_3$ are respectively focal lengths of the first and third lenses and in Mathematical Expression 2, $r_4$ and $r_5$ are respectively a radius of curvature of an incident surface of the second lens and a radius of curvature of an exit surface of the second lens.

2. The lens optical system of claim 1, wherein each of the incident surface and the exit surface of the fourth lens has at least one inflection point from a center portion toward an edge thereof.

3. The lens optical system of claim 1, wherein the incident surface of the fourth lens has one or two inflection points from a center portion toward an edge thereof.

4. The lens optical system of claim 3, wherein the exit surface of the fourth lens has one inflection point from a center portion toward an edge thereof.

5. The lens optical system of claim 1, wherein the exit surface of the fourth lens has one inflection point from a center portion toward an edge thereof.

6. The lens optical system of claim 1, wherein the incident surface of the fourth lens is convex with respect to the object at a center portion of the fourth lens and changed to be concave from the center portion toward an edge of the fourth lens, and the exit surface of the fourth lens is concave with respect to the image sensor at the center portion of the fourth lens and changed to be convex from the center portion toward an edge of the fourth lens.

7. The lens optical system of claim 1, wherein the incident surface of the fourth lens is convex with respect to the object at a center portion of the fourth lens and changed to be concave and then convex from the center portion toward an edge of the fourth lens, and the exit surface of the fourth lens is concave with respect to the image sensor at the center portion of the fourth lens and changed to be convex from the center portion toward an edge of the fourth lens.

8. The lens optical system of claim 1, wherein at least one of an incident surface and an exit surface of at least one of the first to third lenses is an aspherical surface.

9. The lens optical system of claim 1, wherein the second to fourth lenses are aberration correction lenses.

10. The lens optical system of claim 1, further comprising an infrared ray prevention unit that is arranged between the object and the image sensor.

11. The lens optical system of claim 10, wherein the infrared ray prevention unit is arranged between the fourth lens and the image sensor.

12. The lens optical system of claim 1, wherein at least one of the first to fourth lenses is a plastic lens.

* * * * *